US012758040B2

(12) United States Patent
Zhou

(10) Patent No.: US 12,758,040 B2
(45) Date of Patent: Oct. 13, 2026

(54) CHILDREN'S FOUNTAIN CUP

(71) Applicant: Dongguan Easycare Maternal & Infant Supplies Co., Ltd., Dongguan (CN)

(72) Inventor: Wentong Zhou, Zhejiang (CN)

(73) Assignee: Dongguan Easycare Maternal & Infant Supplies Co., Ltd., Dongguan (CN)

( * ) Notice: Subject to any disclaimer, the term of this patent is extended or adjusted under 35 U.S.C. 154(b) by 117 days.

(21) Appl. No.: 18/800,063

(22) Filed: Aug. 11, 2024

(65) Prior Publication Data

US 2025/0057346 A1 Feb. 20, 2025

(30) Foreign Application Priority Data

Aug. 19, 2023 (CN) ........................ 202322233618.X

(51) Int. Cl.
*A47G 19/22* (2006.01)
*B05B 17/08* (2006.01)

(52) U.S. Cl.
CPC ..... *A47G 19/2227* (2013.01); *A47G 19/2222* (2013.01); *A47G 19/2272* (2013.01); *B05B 17/08* (2013.01)

(58) Field of Classification Search
CPC ............ A47G 19/2227; A47G 19/2222; A47G 19/2272; A47G 21/186; A47G 21/18; B05B 17/08
USPC ........ 215/388; 220/705, 707, 709, 710, 744; 446/74, 202
See application file for complete search history.

(56) References Cited

U.S. PATENT DOCUMENTS

| | | | | |
|---|---|---|---|---|
| 7,044,316 B1 * | 5/2006 | Hsu | ...................... | A61J 11/0005 215/11.1 |
| 7,402,092 B1 * | 7/2008 | Randall | .............. | A47G 19/2227 446/176 |

FOREIGN PATENT DOCUMENTS

| | | | | |
|---|---|---|---|---|
| CN | 2707682 Y * | 7/2005 | | |
| CN | 106724593 A * | 5/2017 | ......... | A47G 19/2227 |
| CN | 110786699 A * | 2/2020 | ......... | A47G 19/2227 |
| EP | 2716567 A1 * | 4/2014 | ......... | A47G 19/2266 |
| WO | WO-03101260 A2 * | 12/2003 | ......... | A47G 19/2227 |

OTHER PUBLICATIONS

English Machine Translation of CN-110786699-A (Year: 2020).*
English Machine Translation of CN-2707682-Y (Year: 2005).*
English Machine Translation of CN-106724593-A (Year: 2017).*

* cited by examiner

*Primary Examiner* — Laura E. Parker
(74) *Attorney, Agent, or Firm* — Westbridge IP LLC

(57) ABSTRACT

Disclosed is a children's fountain cup, including a cup body and a cup cover. The cup cover is provided with an air inlet hole, a water return groove is formed on the cup cover, a central tube, a water return tube, a drinking tube and an air inlet tube are further formed the cup cover, the central tube is communicated with the cup body, and the water return tube is communicated with the water return groove and the drinking tube. The air inlet tube is communicated with an air inlet valve. The landscape cover is detachably connected to the cup cover, the water return groove, the central tube and the water return tube are enclosed by the landscape cover, the fountain tube assembly is connected to the central tube, and the drinking tube assembly is connected to the water return tube and the drinking tube.

7 Claims, 6 Drawing Sheets

CHILDREN'S FOUNTAIN CUP

TECHNICAL FIELD

The present disclosure relates to the technical field of drinking cups, and particularly relates to a children's fountain cup.

BACKGROUND

Children's drinking cups are containers through which children drink water therein. By drinking methods, children's drinking cups are divided into straight drinking cups and straw cups. Further, children's drinking cups generally are provided with handles specially designed for children to hold them conveniently, so that children can better control them in the use process. At present, both straight drinking cups and straw cups on the market have a variety of styles. Take a Chinese patent CN218960475U entitled "Dustproof Straw Cup for Children" as an example. The Chinese patent discloses a dustproof straw cup for children. The straw cup includes a cup body and a cup cover, a cup opening is formed on the top of the cup body, the cup cover covers the cup opening, an upper straw vertically distributed is integrally formed on an upper surface of the cup cover, the upper straw is covered with a dustproof cover, and a sealing sheet configured for sealing a top opening of the upper straw is arranged in the dustproof cover. A lower part of the dustproof cover is in magnetic attraction connection with the cup cover through a magnetic attraction device, a lower surface of the cup cover is detachably connected with a lower straw communicated with the upper straw, and a lower portion of the lower straw extends into the cup body. By sucking the upper straw, the user can drink the beverage in the cup body. Take the patent CN218651257U entitled "Silica Gel Drinking Cup for Children" for another example. The patent discloses a straight drinking cup for children, and the straight drinking cup includes an upper cup cover and a lower cup body, a groove is formed at connection positions near inner walls of an upper end and a side end of the upper cup cover, the lower cup body is provided with a clamping edge corresponding to the groove, and the inner wall of the upper end of the upper cup cover is annularly provided with a leakage-proof edge matched with the inner wall of the lower cup body. During assembly, the upper cup cover is covered on the lower cup body, the inner wall of the upper cup cover is in fit with the outer wall of the lower cup body, the clamping edge is embedded in the groove, and the outer wall of the leakage-proof edge is in fit with the inner wall of the lower cup body. The child can drink water by aligning his/her mouth with the water outlet.

Apparently, common drinking cups for children on the market, such as the drinking cups in the above examples, have disadvantages, that is, they only have basic drinking functions, and cannot provide drinking fun for children. Children need a large amount of water replenishment in their daily activities. However, conventional drinking cups for children usually cannot attract children's interest in drinking, thus affecting their daily water replenishment.

SUMMARY

In view of the above situations, in order to overcome the above problem of the prior art that common drinking cups for children only have basic drinking functions, and cannot provide drinking fun for children or attract their interest in drinking, thus affecting their daily water replenishment, the present disclosure provides a children's fountain cup that can generate a dynamic fountain, attract the children with a striking visual effect, and provide sufficient drinking fun for them.

To achieve the above objective, the present disclosure adopts the following technical solution:

A children's fountain cup, including a cup body and a cup cover, further including a landscape cover, a fountain tube assembly and a drinking tube assembly, where the cup cover is provided with an air inlet hole, a water return groove is formed on the cup cover, a central tube, a water return tube, a drinking tube and an air inlet tube are further formed the cup cover, the central tube is communicated with an inner cavity of the cup body, and the water return tube is communicated with the water return groove and the drinking tube; the air inlet tube is communicated with an air inlet valve on a communication tube; and the landscape cover is located in the water return groove and is detachably connected to the cup cover, the water return groove, the central tube and the water return tube are enclosed by the landscape cover, the fountain tube assembly is connected to the central tube, both ends thereof extend to the inner cavity of the cup body and the landscape cover respectively, and the drinking tube assembly is connected to the water return tube and the drinking tube, and extends to an external space.

Preferably, the fountain tube assembly includes a lower straw and a spray decoration tube, the lower straw is inserted into the central tube and extends into the inner cavity of the cup body, one end of the spray decoration tube is sleeved on the central tube, and the other end thereof is provided with a decorative portion, and a plurality of spray holes are formed on the decorative portion.

Preferably, the drinking tube assembly includes the communication tube and an upper straw, both ends of the communication tube are sleeved on corresponding ends of the water return tube and the drinking tube respectively, and the upper straw is sleeved on the other end of the drinking tube; and one end of the air inlet valve on the communication tube is connected to the air inlet tube, and is communicated with the outside world through the air inlet hole, so that when a child drinks water, internal and external air pressures are kept balanced, thereby making it easy to drink water.

Preferably, a counterweight is formed at a free end of the lower straw, and the counterweight is provided with a suction inlet communicated with an inner tube section of the lower straw.

Preferably, the drinking tube assembly further includes a straw lid, and the straw lid includes a sleeve ring, a connecting band and a lid body, where the sleeve ring and the lid body are connected by means of the connecting band, the sleeve ring is sleeved on the upper straw, and the lid body is covered on an end portion of the upper straw to close the upper straw.

Preferably, an annular limiting groove is formed on an outer wall of the upper straw, and the sleeve ring is sleeved in the limiting groove.

Preferably, a locking groove is formed on an outer wall of the lid body, an inner diameter of the locking groove decreases from a middle portion to an opening portion, and at least one first locking block matched with the locking groove in shape is formed on the outer wall of the cup cover.

Preferably, a limiting cap is fixedly arranged on a landscape cover, and a second locking block matched with a locking groove in shape is formed on the limiting cap.

Preferably, the cup body is provided with a handle.

Preferably, both the cup body and the landscape cover are connected to the cup cover in a threaded manner.

Compared with the prior art, the present disclosure has the advantages as follows:

The fountain tube assembly, the central tube, the water return groove, the water return tube, the communication tube, the air inlet tube, the drinking tube, the drinking tube assembly and the landscape cover of the children's fountain cup of the present disclosure together form a channel through which water contained in the inner cavity of the cup body 1 flows outward. When the child user sucks the drinking tube assembly with his/her mouth, a negative pressure is formed in his/her mouth, and the air pressure in the above flow channel is relatively high. According to the principle of pressure difference, water in the inner cavity of the cup body 1 is sucked into the flow channel due to the pressure difference, and finally enters the child's mouth along the flow channel. When the water flows past the fountain tube assembly that forms part of the flow channel and is located in the landscape cover 3, the water will be sprayed out from the fountain tube assembly to form a fountain. At the same time, due to obstruction by the landscape cover, the water sprayed out falls into the water return groove under the action of gravity after contacting the inner wall of the landscape cover, then flows into the water return tube from the water return groove, and finally enters the child's mouth through the communication tube, the drinking tube and the drinking tube assembly for him/her to drink. Based on the above settings, when a child uses the children's fountain cup of the present disclosure to drink, a striking dynamic fountain effect is produced, which can attract children's attention, increase the fun of drinking, and enhance the child's interest in drinking, thereby ensuring that the child can effectively replenish water in the process of daily activities.

Figure 1:
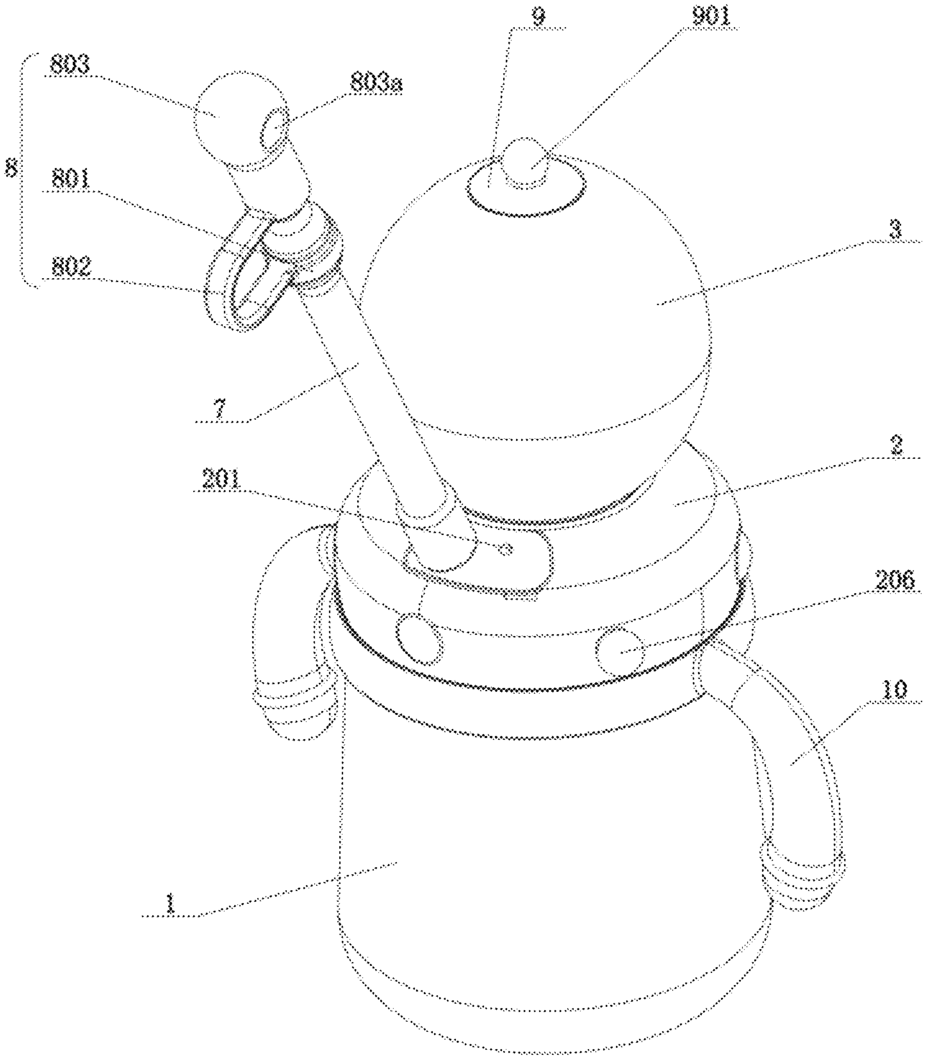
FIG. 1 is a schematic diagram of an overall structure of a children's fountain cup of the present disclosure.

1, cup body; 2, cup cover; 201, air inlet hole; 202, water return groove; 203, central tube; 204, water return tube; 205, drinking tube; 206, first locking block; 207, air inlet tube; 3, landscape cover; 4, lower straw; 401, counterweight; 401*a*, suction inlet; 5, spray decoration tube; 501, decorative portion; 502, spay hole; 6, communication tube; 601, air inlet valve; 7, upper straw; 701, limiting groove; 8, straw lid; 801, sleeve ring; 802, connecting band; 803, lid body; 803*a*, locking groove; 9, limiting cap; 901, second locking block; and 10, handle.

DETAILED DESCRIPTIONS OF THE EMBODIMENTS

The present disclosure will be further described below with reference to the accompanying drawings and specific embodiments.

In the description of the present disclosure, it should be noted that the terms such as "upper", "lower", "left", "right", "inner", and "outer" indicate azimuthal or positional relations based on those shown in the drawings, or of common placement when the product of the present disclosure is used, only for simplicity of description, and are not intended to indicate or imply that the orientation must be a particular orientation and be constructed and operative in a particular orientation, and thus may not be construed as a limitation on the present disclosure.

Embodiment 1

As shown in FIGS. 1, 2, 4 and 5, the present disclosure relates to a children's fountain cup. The children's fountain cup includes a cup body 1, a cup cover 2, a landscape cover 3, a fountain tube assembly and a drinking tube assembly. The cup cover 2 is detachably connected to a mouth of the cup body 1, the cup cover 2 is provided with an air inlet hole 201, and a water return groove 202 is formed on the cup cover 2. More specifically, the water return groove 202 is located on an upper end surface of the cup cover 2, and a central tube 203, a water return tube 204, a drinking tube 205 and an air inlet tube 207 are further formed the cup cover 2, where the central tube 203 is communicated with an inner cavity of the cup body 1, and the water return tube 204 is communicated with the water return groove 202 and the drinking tube 205. The air inlet tube 207 is communicated with an air inlet valve 601 on a communication tube 6. The drinking tube 205 is communicated with the inner cavity and an external space of the cup body 1, the central tube 203 is formed on an upper end surface of the water return groove 202, and the water return tube 204 is located on a lower end surface of the cup cover 2 on the other side of the water return groove 202. The drinking tube 205 is located on upper and lower end surfaces of the cup cover 2 on one side of the water return groove 202. The landscape cover 3 is located in the water return groove 202 and is detachably connected to the cup cover 2 on an outer wall of the water return groove 202. The water return groove 202, the central tube 203 and the water return tube 204 are enclosed by the landscape cover 3 at upper portions thereof, so that the water return groove 202, an internal space of the landscape cover 3 and the inner cavity of the cup body 1 together form a relatively closed space communicated with an outer space only through the drinking tube. The landscape cover 3 of the present disclosure is made of transparent plastic, glass or any other transparent material, so that a child user can directly observe the inside of the landscape cover 3 from outside. The fountain tube assembly is connected to the central tube 203, and both ends thereof extend to the inner cavity of the cup body 1 and the landscape cover 3 respectively. The drinking tube assembly is connected to the water return tube 204, the communication tube 6, the air inlet tube 207 and the drinking tube 205, and extends to an external space. The fountain tube assembly, the central tube 203, the water return groove 202, the water return tube 204, the communication tube 6, the air inlet tube 207, the drinking tube 205, the drinking tube assembly and the landscape cover together form a channel through which water contained in the inner cavity of the cup body 1 flows outward. When the child user sucks the drinking tube assembly with his/her mouth, a negative pressure is formed in his/her mouth, and the air pressure in the above flow channel is relatively high. According to the principle of pressure difference, water in the inner cavity of the cup body 1 is sucked into the flow channel due to the pressure difference, and finally enters the child's mouth along the flow channel. When the water flows past the fountain tube assembly that forms part of the flow channel and is located in the landscape cover 3, the water will be sprayed out from the fountain tube assembly to form a fountain. At the same time, due to obstruction by the landscape cover 3, the water sprayed out falls into the water return groove 202 under the action of gravity after contacting the inner wall of the landscape cover 3, then flows into the water return tube 204 from the water return groove 202, and finally enters the child's mouth through the communication tube 6, the drinking tube 205 and the drinking tube assembly for him/her to drink. Based on the above settings, when a child uses the children's fountain cup of the present disclosure to drink, a striking dynamic fountain effect is produced, which can attract children's attention, increase the fun of drinking, and enhance the child's interest in drinking, thereby ensuring that the child can effectively replenish water in the process of daily activities.

Figure 2:
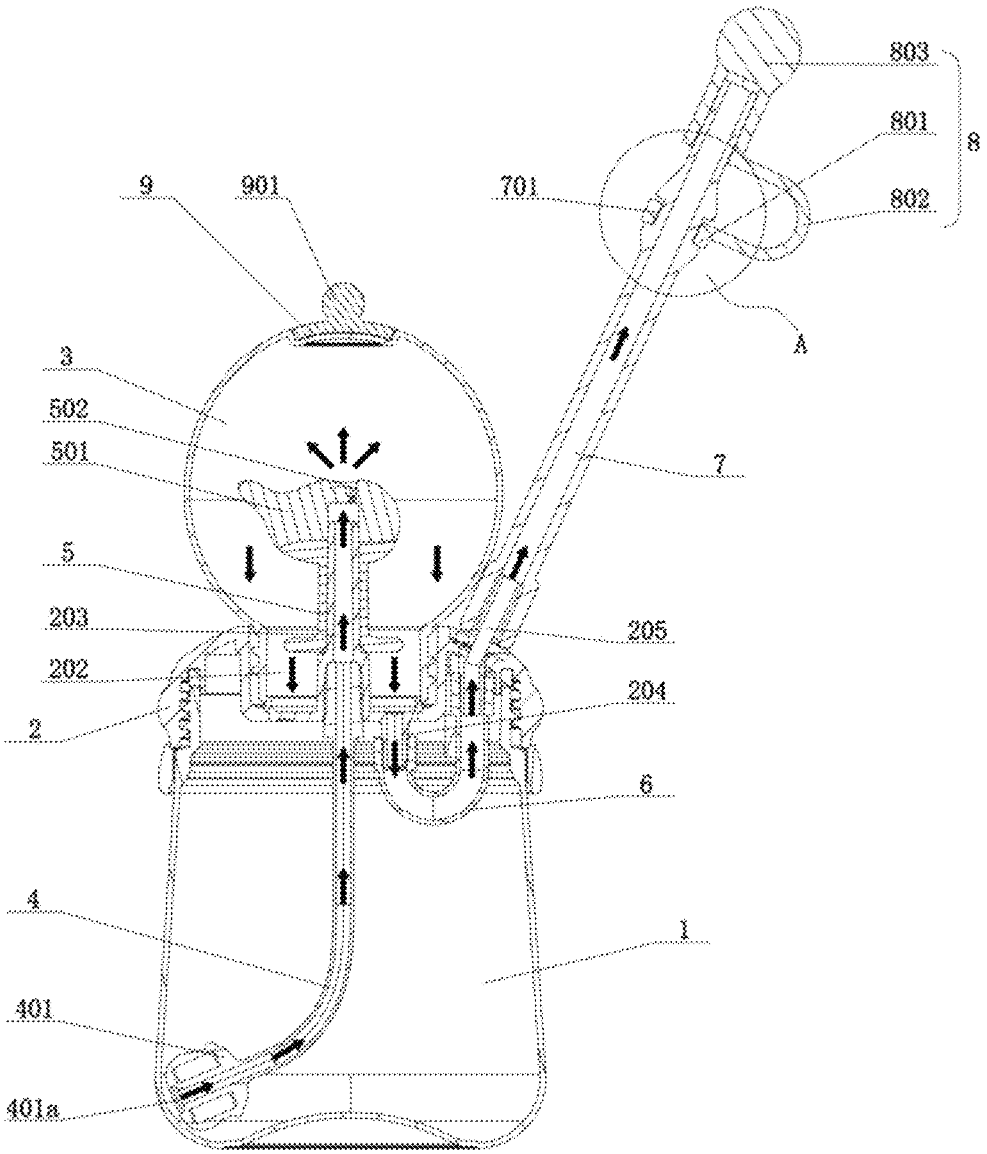
FIG. 2 is a schematic diagram of a sectional structure of a children's fountain cup of the present disclosure in which arrows indicate the directions of water flow when children drink water.
Figure 6:
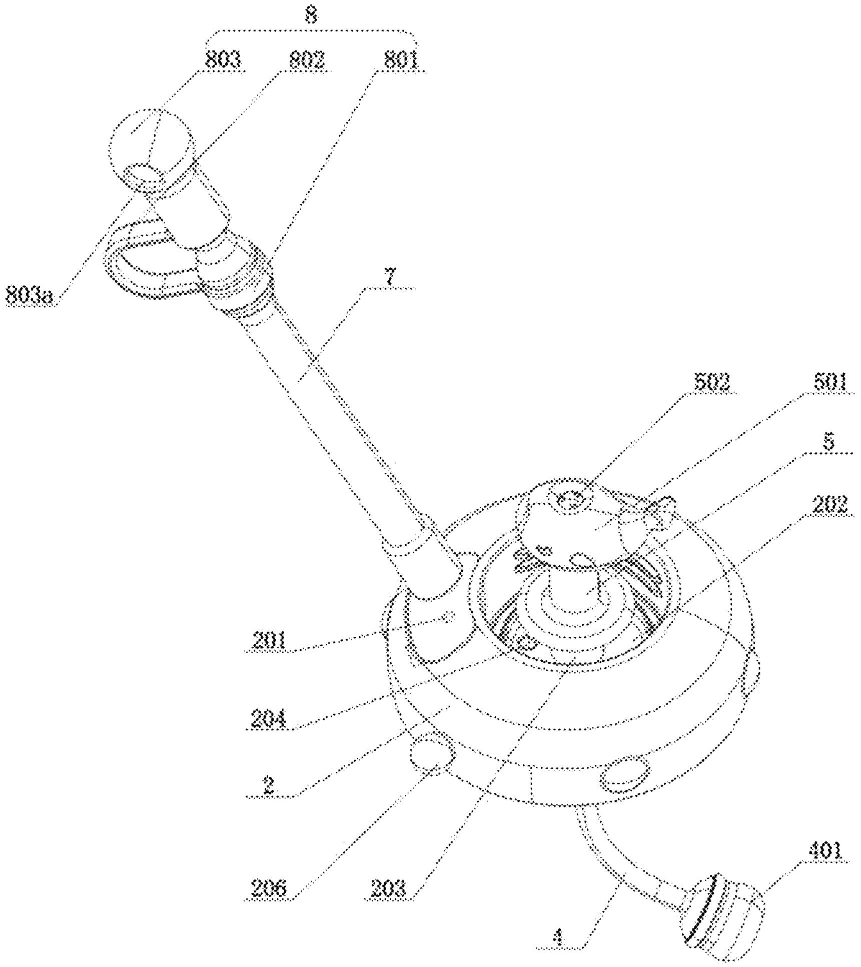
FIG. 6 is a schematic diagram of an overall structure of a cup cover of a children's fountain cup connected with a fountain tube assembly and a drinking tube assembly of the present disclosure.

As shown in FIGS. 2 and 6, the fountain tube assembly includes a lower straw 4 and a spray decoration tube 5, where the lower straw 4 is inserted into the central tube 203 and extends into the inner cavity of the cup body 1. One end of the spray decoration tube 5 is sleeved on the central tube 203, and the other end thereof is provided with a decorative portion 501, where a plurality of spray holes 502 are formed on the decorative portion 501. When the inner cavity of the cup body 1 is filled with water, the lower straw 4 is immersed in the water. When the child sucks the drinking tube assembly, the water in the inner cavity of the cup body 1 is first sucked into the lower straw 4 that constitutes part of the flow channel, flows along the lower straw 4, then flows past the central tube 203 and the spray decoration tube 5 sequentially, and finally is sprayed out from the plurality of spray holes 502 in different orientations to form a fountain. The decorative portion 501 can be designed to be of any shape, such as an animal, a plant, and the like to attract children. In the present disclosure, the decorative portion 501 is shaped like a whale, which, in combination with the fountain design, attracts more attention of children in the drinking process.

Figure 7:
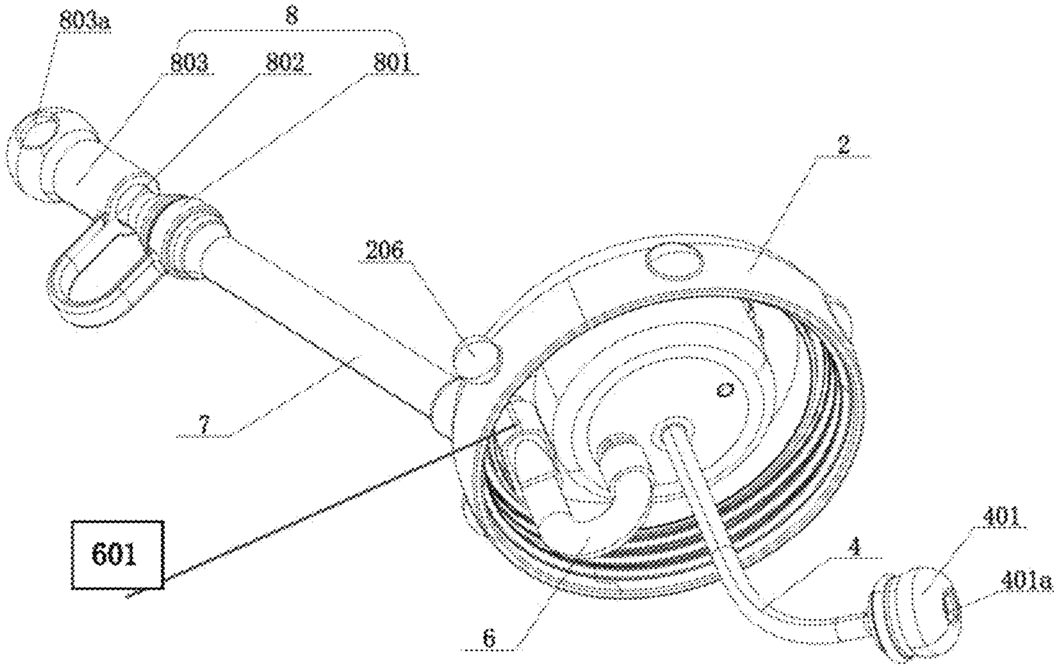
FIG. 7 is a schematic diagram of another view of an overall structure of a cup cover of a children's fountain cup connected with a fountain tube assembly and a drinking tube assembly of the present disclosure.
Figure 8:
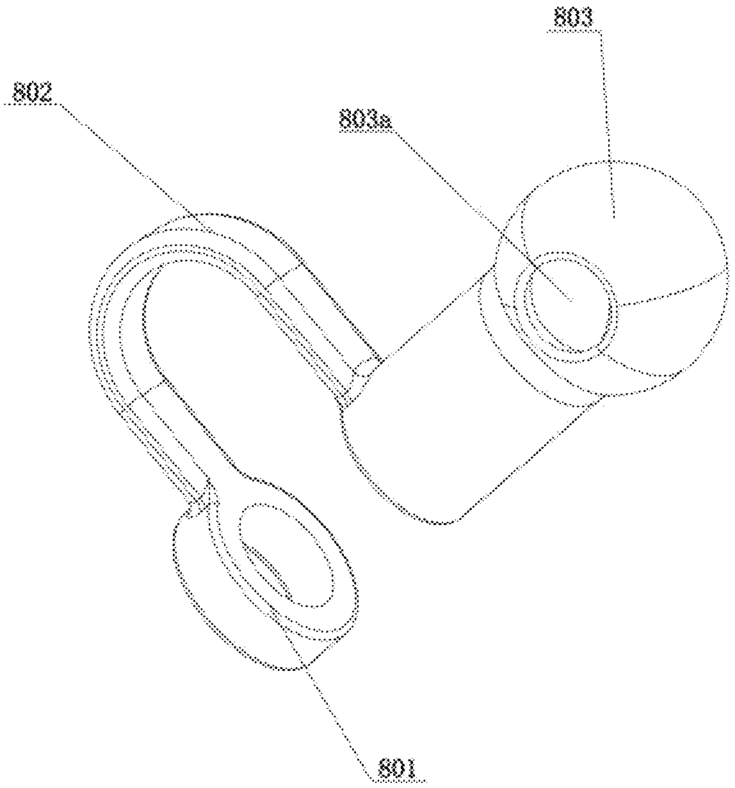
FIG. 8 is a schematic diagram of an overall structure of a straw lid of a drinking tube assembly of a children's fountain cup of the present disclosure.

As shown in FIGS. 2, 6 and 7, the drinking tube assembly includes the communication tube 6 and an upper straw 7, where both ends of the communication tube 6 are sleeved on corresponding ends of the water return tube 204 and the drinking tube 205 respectively, and the air inlet valve 601 on the communication tube 6 is sleeved on the air inlet tube 207. Overall, the communication tube 6 is U-shaped, and the upper straw 7 is sleeved on the other end of the drinking tube 205, that is, sleeved on a portion outside the cup cover 2. When water forming the fountain falls into the water return groove 202, the water first flows into the water return tube 204 constituting part of the flow channel, then flows into the communication tube 6 located below and communicated with the water return tube 204, then flows into the drinking tube 205 and the upper straw 7 through the communication tube 6, and finally enters the child's mouth for him/her to drink.

As shown in FIGS. 2, 6 and 7, a counterweight 401 is formed at a free end of the lower straw 4, and the counterweight 401 is provided with a suction inlet 401*a* communicated with an inner tube section of the lower straw 4. Under the action of the counterweight 401, one end of the lower straw 4 provided with the counterweight 401 sinks to the bottom of the inner cavity of the cup body 1, so that even when there is less water in the inner cavity of the cup body 1, the child can still suck the water, thus avoiding the residue and waste of water.

As shown in FIGS. 1-2 and FIGS. 6-8, the drinking tube assembly further includes a straw lid 8, and the straw lid includes a sleeve ring 801, a connecting band 802 and a lid body 803, where the sleeve ring 801 and the lid body 803 are connected by means of the connecting band 802, the sleeve ring 801 is sleeved on the upper straw 7, and the lid body 803 is covered on an end portion of the upper straw 7 to close the upper straw 7. When the children's fountain cup of the present disclosure is not in use, the water contained in the inner cavity of the cup body 1 can be prevented from overflowing, thereby preventing a placement surface or clothes from being splashed. Further, to drink water, the child only needs to remove the lid body 803 from the upper straw 7. In this way, the child can drink the water in the inner cavity of the cup body 1 through the upper straw 7. The connecting band 802 is always capable of limiting the lid body 803 to the periphery of the upper straw 7 to prevent the loss of the small-sized lid body 803.

Figure 3:
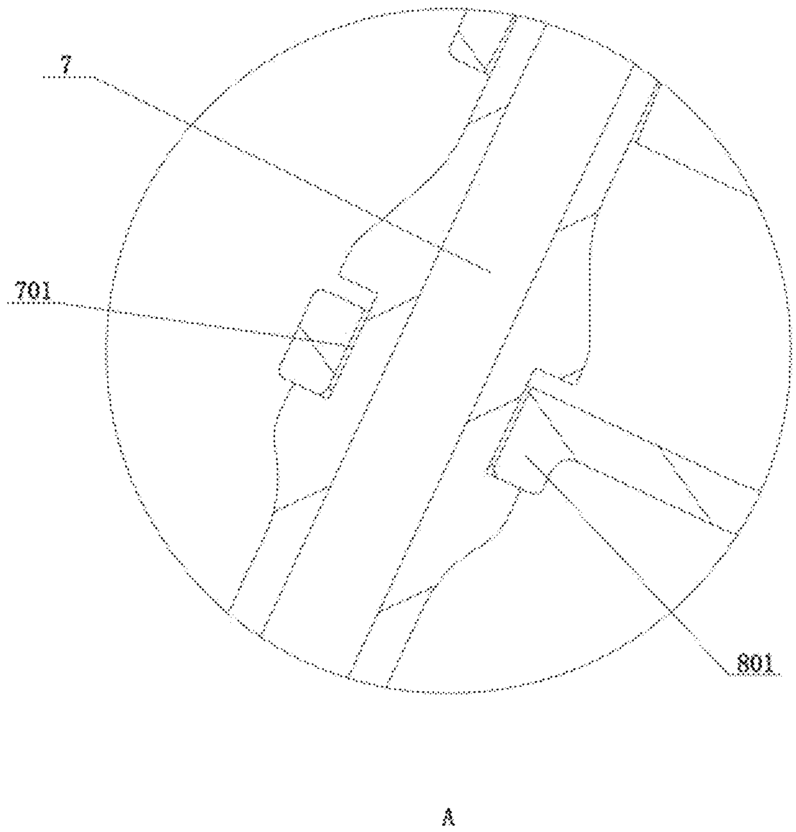
FIG. 3 is a schematic diagram of an enlarged structure of a portion A in FIG. 2 of the present disclosure.
Figure 4:
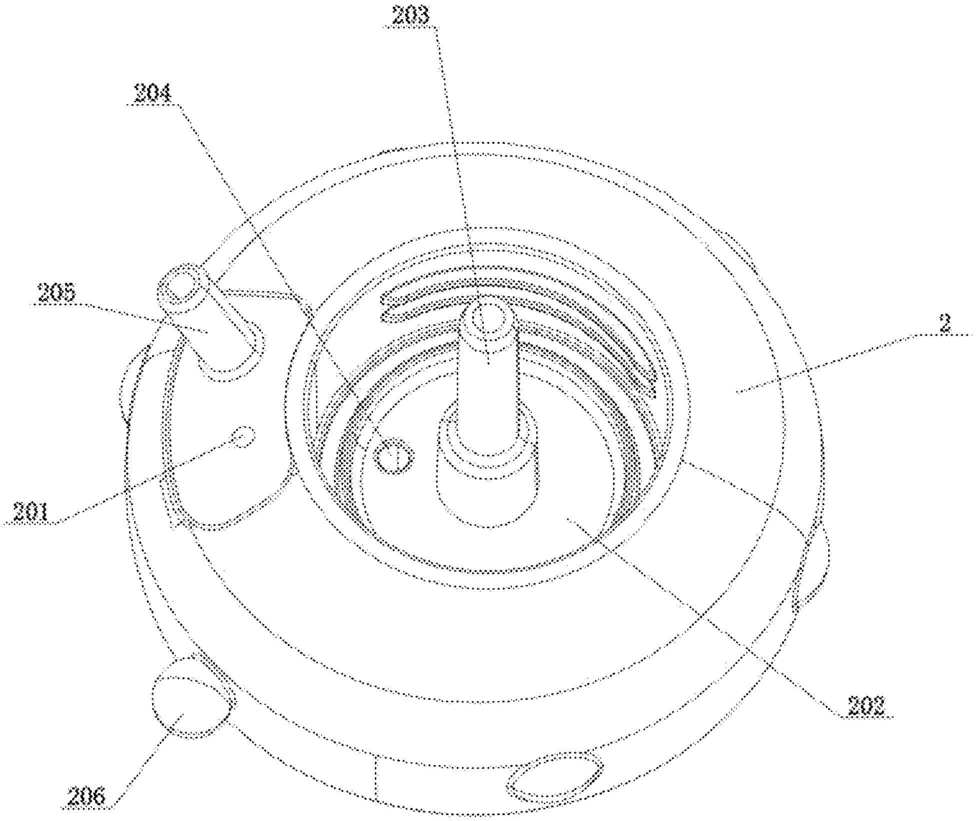
FIG. 4 is a schematic diagram of an overall structure of a cup cover of a children's fountain cup of the present disclosure.
Figure 5:
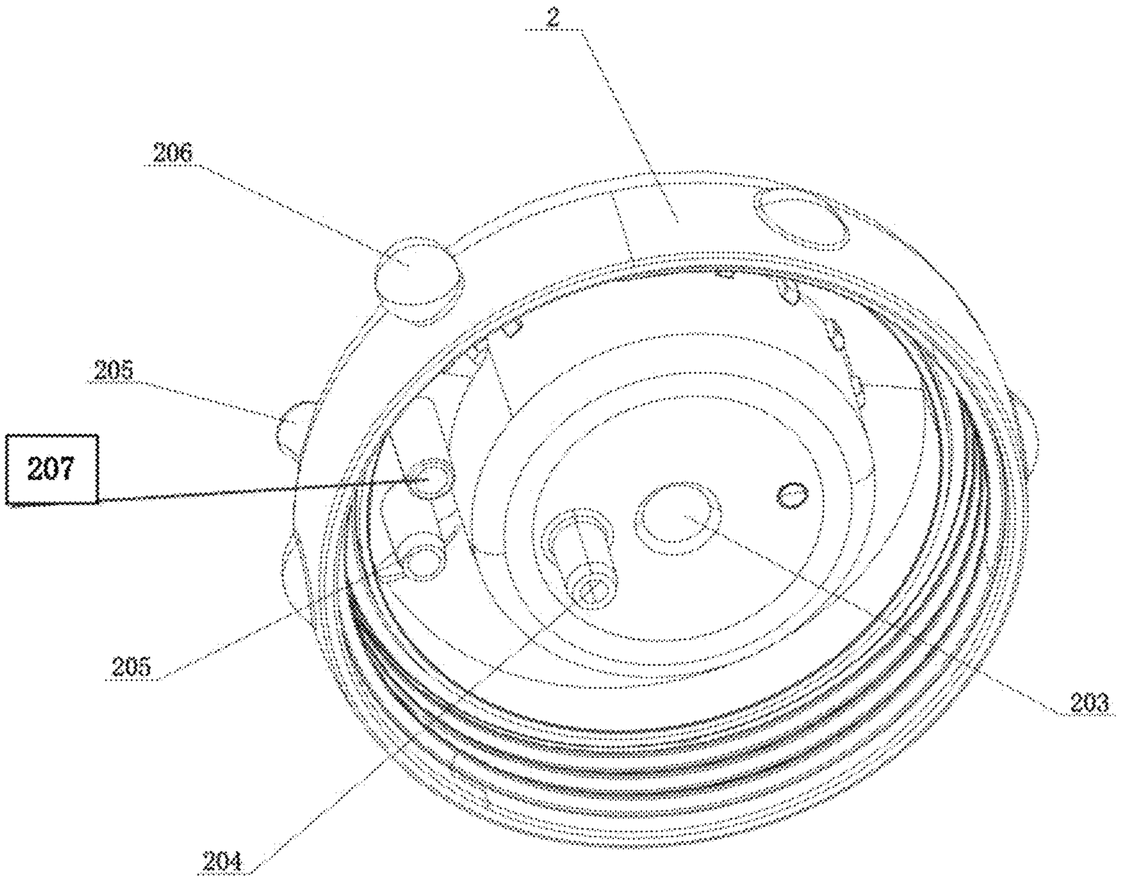
FIG. 5 is a schematic diagram of another view of an overall structure of a cup cover of a children's fountain cup of the present disclosure.

As shown in FIGS. 2 and 3, an annular limiting groove 701 is formed on an outer wall of the upper straw 7, and the sleeve ring 801 is sleeved in the limiting groove 701. Based on the above settings, inner walls on both sides of the limiting groove 701 are used to limit the sleeve ring 801 of the straw lid 8 to move along the upper straw 7, so that the straw lid 8 is firmly fixed relative to the upper straw 7, thereby avoiding slippage.

As shown in FIGS. 1-2 and FIGS. 4-8, a locking groove 803*a* is formed on an outer wall of the lid body 803, an inner diameter of the locking groove 803*a* decreases from a middle portion to an opening portion, and at least one first locking block 206 matched with the locking groove 803*a* in shape is formed on the outer wall of the cup cover 2. When the children's fountain cup of the present disclosure is not used temporarily, the lid body 803 and the cup cover 2 are fixed by inserting any first locking block 206 into the locking groove 803*a*, and the lid body 803 drives the upper straw 7 connected thereto to be fixedly connected to the cup cover 2, thereby preventing the flexible upper straw 7 from shaking when being carried, so that the children's fountain cup of the present disclosure can be better stored and carried.

As shown in FIG. 1, the cup body 1 is provided with a handle 207, and the handle 207 is configured to help children better control the fountain cup of the present disclosure by holding it.

Further, both the cup body 1 and the landscape cover 3 are connected to the cup cover 2 in a threaded manner. The threaded connection enables a high-strength connection between the cup body 1, the cup cover 2 and the landscape cover 3, which also facilitates fast assembly and disassembly. Further, the threaded connection has self-locking characteristics. In the process of normal use, the cup body 1, the cup cover 2 and the landscape cover 3 are not easily loosened without any external force or vibration, thereby improving the stability and safety of the connection.

Embodiment 2

As shown in FIGS. 1 and 2, an optimal design is made in this embodiment based on the above Embodiment 1. Specifically, a limiting cap 9 is fixedly arranged on a landscape cover 3, and a second locking block 901 matched with a locking groove 803*a* in shape is formed on the limiting cap 9. Based on the above settings, another fixed point is provided for positioning an upper straw 7, that is, the upper straw 7 can be fixedly connected to the landscape cover 3 through a lid body 803 of a straw lid 8 connected thereto, so that children can freely choose any fixed point to fix the upper straw 7 in various situations.

In combination with Embodiment 1 and Embodiment 2, and with reference to FIGS. 1-8, when a child intends to use the children's fountain cup of the present disclosure to drink water, he/she needs to first remove the lid body 803 of the straw lid 8 arranged on the upper straw 7 of the drinking tube assembly, and open the opening of the upper straw 7, to drink the water in the inner cavity of the cup body 1 by sucking the upper straw 7. When the child sucks, the water contained in the inner cavity of the cup body 1 first flows into the lower straw 4 through the suction inlet 401*a* on the counterweight 401 of the lower straw 4 of the fountain tube assembly that constitutes part of the flow channel, then flows into the spray decoration tube 5 through the lower straw 4 and the central tube 203 sequentially, and then is sprayed out from the spray holes 502 of the spray decoration tube 5 to form a fountain in the landscape cover 3. At the same time, the water sprayed out falls into the water return groove 202 under the action of gravity after contacting the inner wall of the landscape cover 3, then flows into the water return tube 204 from the water return groove 202, flows into the communication tube 6 located below and communicated with the water return tube 204, flows into the drinking tube 205 and the upper straw 7 through the communication tube 6, and finally enters the child's mouth for him/her to drink. The striking dynamic fountain effect can attract children's attention, increase the fun of drinking, and enhance the child's interest in drinking, thereby ensuring that the child can effectively replenish water in the process of daily activities.

The descriptions in the foregoing embodiments and the specification are merely illustrative of the principles and preferred embodiments of the present disclosure. Various changes and improvements will be made in the present disclosure without departing from the spirit and scope of the present disclosure, and all these changes and improvements fall within the scope of the present disclosure.

What it claimed is:

1. A children's fountain cup, comprising a cup body and a cup cover, further comprising a landscape cover, a fountain tube assembly and a drinking tube assembly, wherein the cup cover is provided with an air inlet hole, a water return groove is formed on the cup cover, a central tube, a water return tube, a drinking tube, and an air inlet tube are further formed on the cup cover, the central tube is communicated with an inner cavity of the cup body, and the water return tube is communicated with the water return groove and the drinking tube;

the air inlet tube is communicated with an air inlet valve on a communication tube;

the landscape cover is located in the water return groove and is detachably connected to the cup cover, wherein the water return groove, the central tube, and the water return tube are enclosed by the landscape cover, the fountain tube assembly is connected to the central tube, with one end of the fountain tube assembly extending into the inner cavity of the cup body and the other end of the fountain tube assembly extending into the landscape cover, and the drinking tube assembly is connected to the water return tube and the drinking tube, and extends to an external space;

the drinking tube assembly comprises the communication tube and an upper straw, both ends of the communication tube are sleeved on corresponding ends of the water return tube and the drinking tube respectively, and the upper straw is sleeved on the other end of the drinking tube; and one end of the air inlet valve on the communication tube is connected to the air inlet tube, and is communicated with an outside world through the air inlet hole, so that when a child drinks water, internal and external air pressures are kept balanced, thereby making it easy to drink water;

the drinking tube assembly further comprises a straw lid, and the straw lid comprises a sleeve ring, a connecting band, and a lid body, wherein the sleeve ring and the lid body are connected by means of the connecting band, the sleeve ring is sleeved on the upper straw, and the lid body is covered on an end portion of the upper straw to close the upper straw; and a locking groove is formed on an outer wall of the lid body, an inner diameter of the locking groove decreases from a middle portion to an opening portion, at least one first locking block is formed on the outer wall of the cup cover, and the at least one first locking block is shaped to match the locking groove.

2. The children's fountain cup according to claim 1, wherein the fountain tube assembly comprises a lower straw and a spray decoration tube, the lower straw is inserted into the central tube and extends into the inner cavity of the cup body, one end of the spray decoration tube is sleeved on the central tube, and the other end thereof is provided with a decorative portion, and a plurality of spray holes are formed on the decorative portion.

3. The children's fountain cup according to claim 2, wherein a counterweight is formed at a free end of the lower straw, and the counterweight is provided with a suction inlet communicated with an inner tube section of the lower straw.

4. The children's fountain cup according to claim 1, wherein an annular limiting groove is formed on an outer wall of the upper straw, and the sleeve ring is sleeved in the limiting groove.

5. The children's fountain cup according to claim 4, wherein a limiting cap is fixedly arranged on the landscape cover, a second locking block is formed on the limiting cap, and the second locking block is shaped to match the locking groove.

6. The children's fountain cup according to claim 1, wherein the cup body is provided with a handle.

7. The children's fountain cup according to claim 1, wherein both the cup body and the landscape cover are connected to the cup cover in a threaded manner.

* * * * *